United States Patent [19]

Tsukada et al.

[11] Patent Number: 4,652,871
[45] Date of Patent: Mar. 24, 1987

[54] X-Y POSITION INPUT DEVICE FOR DISPLAY SYSTEM

[75] Inventors: Jiro Tsukada; Junichi Hosogoe; Yuichi Ida, all of Miyagi, Japan

[73] Assignee: Alps Electric Co., Ltd., Japan

[21] Appl. No.: 808,361

[22] Filed: Dec. 12, 1985

Related U.S. Application Data

[63] Continuation of Ser. No. 586,078, Mar. 5, 1984, abandoned.

[30] Foreign Application Priority Data

Mar. 3, 1983 [JP] Japan .............................. 58-29801[U]
Mar. 3, 1983 [JP] Japan .............................. 58-29806[U]
Mar. 3, 1983 [JP] Japan .............................. 58-29807[U]

[51] Int. Cl.$^4$ .................................................. G09G 1/00
[52] U.S. Cl. ............................... 340/710; 74/471 XY; 178/18
[58] Field of Search ................ 340/710, 709, 706; 74/471 XY, 198; 178/18, 19, 20

[56] References Cited

U.S. PATENT DOCUMENTS 3,013,441 12/1961 Alexander .............................. 74/198
4,404,865 9/1983 Kim ....................................... 340/710
4,464,652 8/1984 Lapson et al. ........................ 340/710
4,612,539 9/1986 Hosogoe et al. ..................... 340/710

Primary Examiner—Marshall M. Curtis
Attorney, Agent, or Firm—Guy W. Shoup

[57] ABSTRACT

An X-Y input device comprises a rotatable ball, a first driven roller held in contact with the rotatable ball and rotatable in response to rotation of the rotatable ball, a second driven roller held in contact with the rotatable ball and rotatable in response to rotation of the rotatable ball, the second driven roller having an axis of rotation extending substantially perpendicularly to that of the first driven roller, first rotation detector means for detecting an amount of rotation of the first driven roller, and second rotation detector means for detecting an amount of rotation of the second driven roller. The X-Y input device also includes means for imposing frictional forces between the ball and the driven rollers, stop means for stopping operation of the rotation detector means and blocking rotation of the driven rollers when the operation of the rotation detector means reaches predetermined limits, and power release means for reducing power transmitted from the ball to the rotation detector means when the operation of the rotation detector means reaches the limits.

14 Claims, 32 Drawing Figures

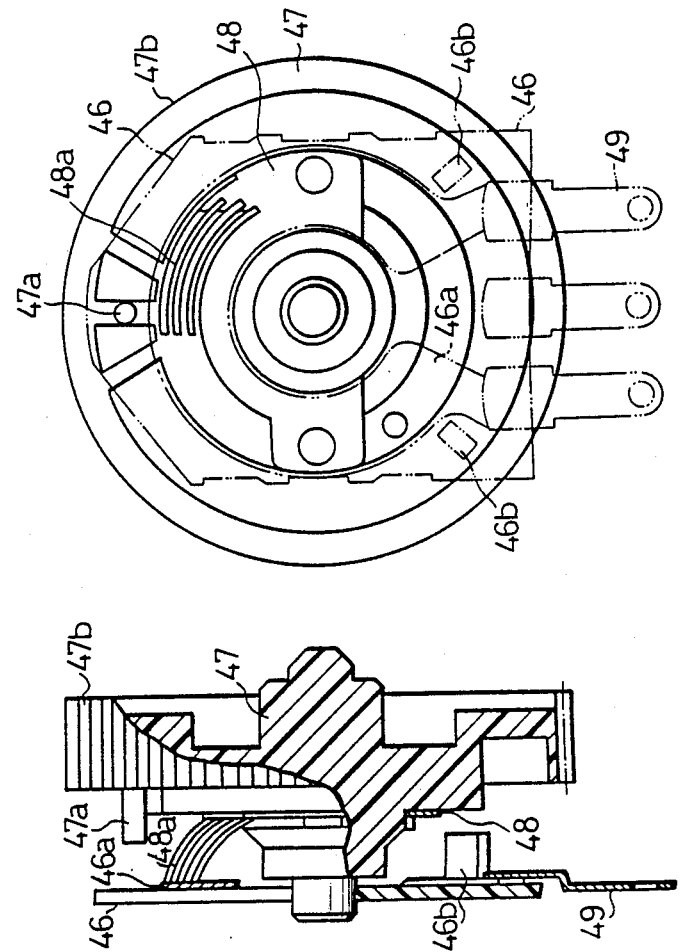

X-Y POSITION INPUT DEVICE FOR DISPLAY SYSTEM

This is a continuation application from application Ser. No. 586,078 filed Mar. 5, 1984, now abandoned.

BACKGROUND OF THE INVENTION

The present invention relates to an X-Y input device, and more particularly to an X-Y input device suitable for use as a graphics input device associated with a graphic display apparatus.

Graphic display apparatus are basically composed of a display screen, a display controller, a data channel, and an input device which may be of various types. One known input device is a "joystick" having a lever supported by a gimbal mechanism and tiltable by the operator in any direction. A control device detects the direction and angle of tilt of the lever and generates voltages or digital signals indicative of coordinate values in X and Y directions. This type of input device is disadvantageous however in that the range of angular movement of the lever is limited and data signals entered by the operator are relatively unstable.

In an effort to eliminate the above shortcomings, there has in recent years been developed an input device called a "mouse". One type of mouse has a rotatable member such as a steel ball (hereinafter referred to as a "ball"), a first driven roller held in contact with the ball and rotatable in response to rotation thereof, and a second driven roller held in contact with the ball and rotatable in response to rotation thereof. The first and second rollers have their axes of rotation extending substantially perpendicularly to each other. The mouse also includes first and second angle detector means composed of variable resistors and encoders for separately detecting angles of rotation of the first and second driven rollers. The ball, first and second driven rollers, and first and second angle detector means are all housed in a casing.

The casing has an opening defined in its bottom with the ball partly projecting through the opening. In use, the casing is held by the operator to place the ball against a given base or surface. By moving the case to cause the ball to roll on the surface in any desired two-dimensional direction, the first and second driven rollers are rotated about their own axes in directions and through angles dependent on the rolling movement of the ball. The directions and angles of rotation of the driven rollers are converted by the first and second angle detector means into voltages or digital signals representative of coordinate values in X and Y directions. The generated signals are then entered into a display apparatus.

SUMMARY OF THE INVENTION

It is an object of the present invention to provide an X-Y input device of the type known as a mouse, which is highly reliable in construction and operation.

According to the present invention, frictional force imposing means is disposed in confronting relation to said ball and comprises a frictional force imposing roller for resiliently urging a ball against first and second driven rollers for imposing a frictional force between the ball and the driven rollers, the frictional force imposing roller having a shaft, a slider rotatably housing the frictional force imposing roller and having recesses opening toward the ball and supporting ends of the shaft of the frictional force imposing roller therein and a spring bearing portion, a holder having a front opening and slidably accommodating the slider, the holder including a rear wall having a spring bearing portion and side walls having hooks on front ends thereof for preventing the frictional force imposing roller from being dislodged from the slider, and a spring interposed under compression between the spring bearing portion of the holder and the spring bearing portion of the slider, the frictional force imposing roller having a peripheral portion projecting out of the front opening in the holder.

Therefore, the holder, the slider, the spring, and the frictional force imposing roller can be assembled as a unit, and the frictional force imposing roller is prevented from projecting out or dropping off while the input device is being assembled. The assembling procedure for the input device can thus be simplified.

Further according to the present invention, there is provided a stop means for limiting the displacement of each of the first and second displacement members to a predetermined displaceable range, for preventing any further displacement of each of the first and second displacement members when the displacement members reach limits of the predetermined displaceable range to keep output values from the first and second rotation detector means at a constant value, and for blocking the ball against rotation when the displacement members reach the limits of the predetermined displaceable range, the stop means having a blocking force for blocking the ball against rotation, the blocking force being greater than a frictional force between the ball and the driven rollers, so that when the displacement members reach the limits of the predetermined displaceable range, the stop means blocks rotation of the driven rollers while allowing the ball to rotate and slip on the driven rollers.

Still further according to the present invention, each of the rotation detector means has a displacement member stop for limiting the displacement of each of the first and second displacement members to a predetermined displaceable range and for preventing any further displacement of each of the first and second displacement members when the displacement members reach limits of the predetermined displaceable range to keep output values from the first and second rotation detector means at a constant value, the displacement member having a blocking force for blocking the driven roller against rotation, power release means disposed in a power transmission path between each of the driven rollers and a corresponding one of the rotation detector means for releasing a portion of power from the driven roller and applying an engagement force smaller than the blocking force to the rotation detector means, so that the power release means remains inactivated when the displacement of the rotation detector means is in the predetermined displaceable range, for allowing power to be transmitted from the ball to the rotation detector means to permit the latter to detect the amount of rotation of the ball, and when the displacement of the rotation detector means reaches the limits of the predetermined displaceable range, the displacement member is prevented by the displacement member stop from moving and the power release means is actuated to reduce power transmitted from the ball to the rotation detector means.

With the above arrangement, if the ball is rotated further when a cursor reaches one end of the screen of a display unit, no cursor will appear from the opposite end of the screen, and signals can be processed properly through the input device of the invention.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a side elevational view, partly shown in cross section, of a rotation detector means in the form of a rotary variable resistor;

FIG. 9 is a front elevational view, with parts omitted from illustration, of the rotation detector means;

DESCRIPTION OF THE PREFERRED EMBODIMENTS

Figure 1:
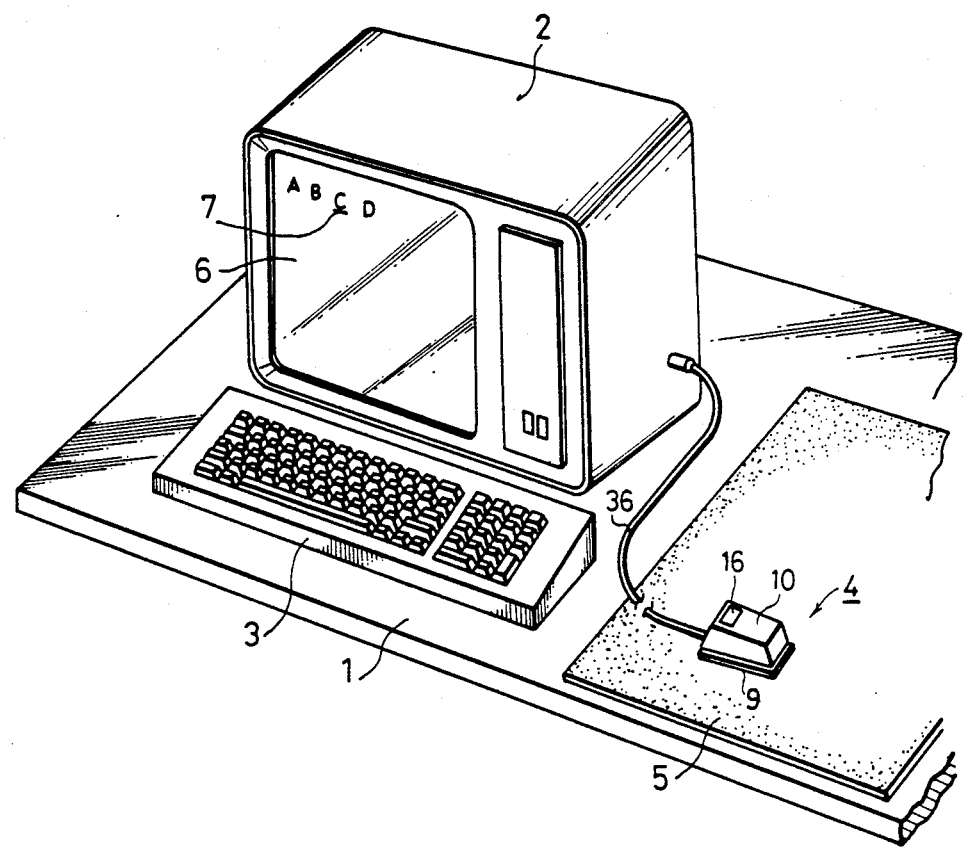
FIG. 1 is a perspective view of a graphic display apparatus including an X-Y input device according to the present invention.

FIG. 1 shows in perspective a graphic display apparatus incorporating therein an X-Y input device according to the present invention.

The graphic display apparatus illustrated in FIG. 1 comprises a display unit 2 mounted on a table 1 and having a screen, a controller, and a data channel, an input device 3 having function keys, and an X-Y input device 4 according to the present invention. The X-Y input device 4 is operated by the operator on a sheet 5 placed on the table 1 to move a cursor 7 to any desired position on a screen 6 of the display unit 2.

Figure 2:
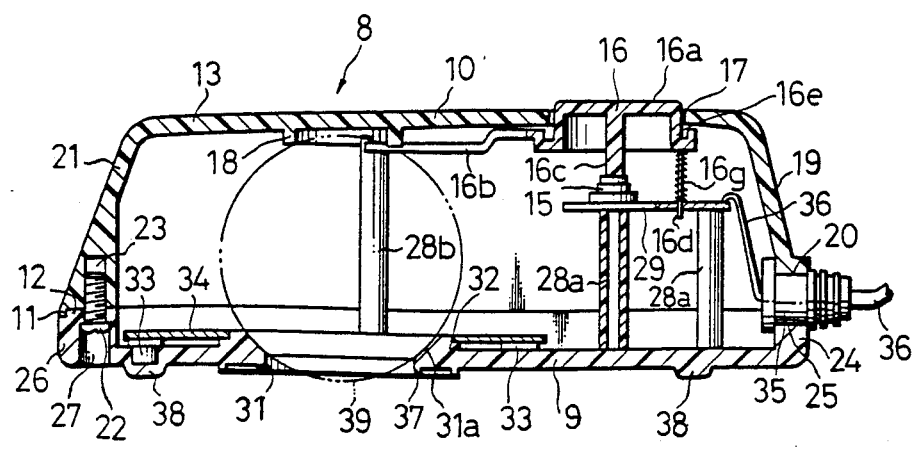
FIG. 2 is a vertical cross-sectional view of the X-Y input device with certain parts omitted from illustration.

The construction and principles of operation of the X-Y input device 4 will be described with reference to FIGS. 2 and 3.

The X-Y input device 4 has a casing 8 composed of a lower case 9 and an upper case 10, the lower and upper cases 9, 10 being molded of hard synthetic resin. As shown in FIGS. 2 and 3, the upper case 10 has a lower end 11 fitted over an upper end 12 of the lower case 9 to prevent dust, water and other foreign matter from entering into the casing 8 through the joint between the lower case 9 and the upper case 10.

The upper case 10 is of a size which can be held by one hand of the operator. As illustrated in FIGS. 2 and 3, the upper case 10 includes a slanted upper wall 13 and a pair of slanted side walls 14 that allow the operator to hold the upper case 10 with ease. The upper wall 13 has an elongate slot 17 defined therethrough in which a control lever 16 of a switch 15 is fitted. The switch 15 comprises a pushbutton switch 15 for deleting a portion of a displayed pattern immediately above the cursor 7, move such a displayed pattern portion to another location, or effect other control on the display unit 2. As shown in FIG. 2, the control lever 16 projects slightly upwardly through the upper case 10.

The upper wall 13 has an integral sleeve 18 projecting downwardly from an inner surface of the upper wall 13. The upper case 10 includes a front wall 19 having a substantially central recess 20 for receiving a bushing therein, and a rear wall 21 having a substantially central screw insertion block 23 on an inner surface thereof for receiving a self-tapping screw 22. The front wall 19 also has at inner corners similar screw insertion blocks for receiving self-tapping screws 22.

The lower case 9 includes a front wall 24 having a substantially central recess 25 positioned in alignment with the recess 20 in the front wall 19 of the upper case 10 for receiving the bushing therein. The lower case 9 also includes a rear wall 26 having a substantially central screw insertion block 27 on an inner surface thereof in registry with the screw insertion block 23 on the rear wall 21 of the upper case 10. The front wall 24 also has at inner corners similar screw insertion blocks 27 in registry with the screw insertion blocks on the front wall 19 of the upper case 10.

A plurality (five in the illustrated embodiment) of studs 28 project integrally from the lower case 9. The three front studs 28a support a printed-circuit board 29 having an electrically conductive pattern (not shown) and fastened by screws 30 to upper ends of the studs 28a, as illustrated in FIGS. 2 and 3. The two central studs 28b have on upper ends lever supports or slots 28c on which ends of the control lever 16 are pivotably supported.

The lower case 9 has a central circular opening 31 defined by an upper tapered surface 31a flaring upwardly and having an upper tubular end projecting from an inner surface of the lower case 9 for centering purpose. An annular step 32 extends around the projecting tubular end. A ball 39 is seated on the tapered surface 31a around the opening 31 and held in the opening 31 at a slightly floating state therein. The annular step 32 lies flush with projections 33 positioned on the inner surface of the lower case 9 around the opening 31. An attachment plate 34 is placed on the annular step 32 and the projections 33. The attachment plate 34 is positioned with respect to the ball 39 by placing a central hole 34a in the attachment plate 34 around the annular step 32.

A bushing 35 of rubber is fitted in the recesses 20, 25 in the lower case 9 and the upper case 10 for protecting a signal cable 36 extending through the bushing 35. The signal cable 36 has one end connected to the printed-circuit board 29 and an opposite end to an input terminal of the display unit 2 and is long enough to allow desired controlled movement of the input device 4 over the sheet 5.

The lower case 9 has on a lower surface an annular ridge 37 serving to protect the lower edge of the opening 31 and also two front projections 38. The annular ridge 37 and the front projections 38 serve to support the input device 4 stably.

Figure 4:
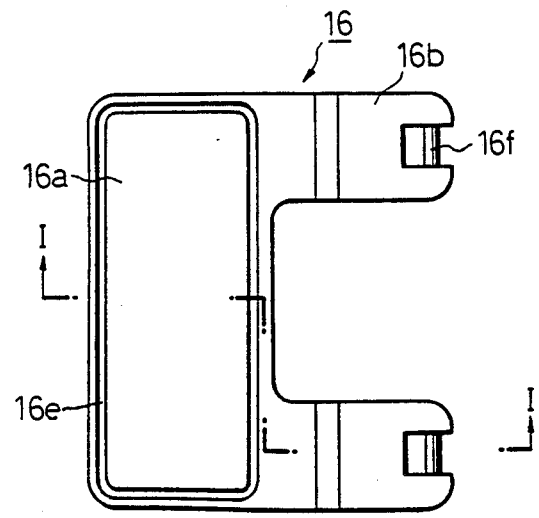
FIG. 4 is a plan view of a control lever in the X-Y input device.
Figure 5:
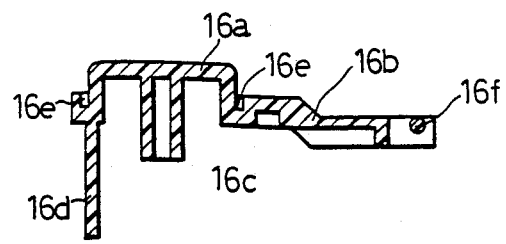
FIG. 5 is a vertical cross-sectional view taken along line I—I of FIG. 4.
Figure 6:
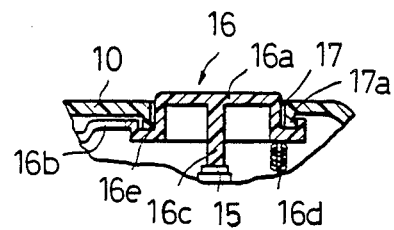
FIG. 6 is a fragmentary vertical cross-sectional view showing a control lever according to a modification, fitted in a hole defined in an upper case.

FIG. 4 is a plan view of the control lever 16 and FIG. 5 is a cross-sectional view of the control lever 16. The control lever 16 is substantially in the form of a C composed of an upwardly projecting finger presser 16a and a pair of pivotable arms 16b extending from the finger presser 16a. The finger presser 16a has a central leg 16c extending from a lower surface thereof and held in abutment against an upper surface of the switch 15 and a guide rod 16d projecting from the lower surface at a front edge thereof and extending through a guide hole 29a defined in the printed-circuit board 29. A return spring 16g is coiled around the guide rod 16d for normally pressing the control lever 16 upwardly. The finger presser 16a has an integrally molded groove 16e extending therearound and positioned below the edge of the elongate slot 17 in the upper case 10 for preventing water droplets or dust from finding its way into the casing 8. FIG. 6 shows a modified control lever 16 having a groove 16e of an increased width in which there is disposed a depending wall 17a projecting downwardly from the edge of the slot 17 in the upper case 10 for more effective prevention of entry of water droplets and dust into the casing 8.

The pivotable arms 16b of the control lever 16 have on their distal ends lateral pins 16f fitted, from above, in the slots 28c in the two central studs 28b on the lower case 9. The control lever 16 is pivotally movable about the pins 16f. Since the finger presser 16a is spaced from the pins 16f by a relatively large distance, the leg 16c will depress the switch 15 for turning on or off the latter in response to depression of the finger presser 16a at any location thereon.

Figure 7:
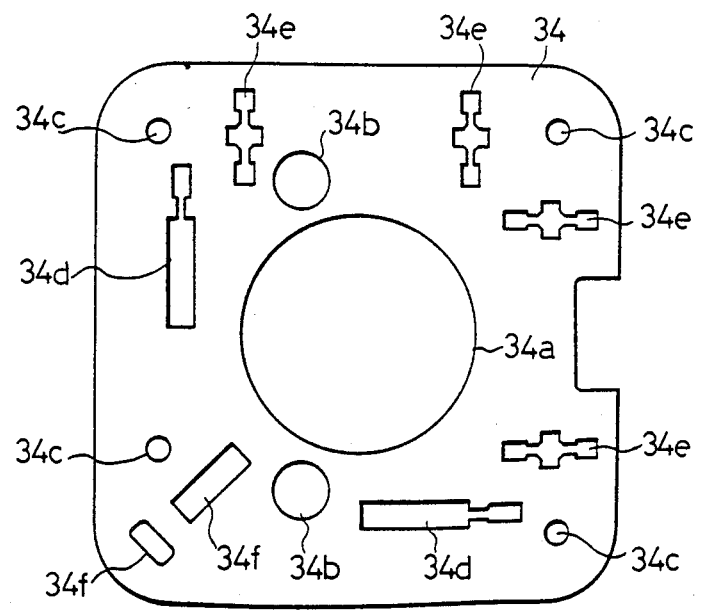
FIG. 7 is a plan view of an attachment plate.

FIG. 7 illustrates the attachment plate 34 on which various parts are mounted. The attachment plate 34 is made of metal with the hole 34a defined for fitting engagement with the annular step 32 of the lower case 9. Around the hole 34a, the attachment plate 34 has two insertion apertures 34b, 34b for passage of the studs 28b on the lower case 9, internally threaded apertures 34c in which screws 40 are threaded for mounting the attachment plate 34 on the lower case 9, two engagement apertures 34d for engaging rotation detector means 41, four engagement apertures 34e for engaging bearings 42, and an engagement aperture 34f for fastening a holder 44 of a frictional force imposing means 43.

As shown in FIGS. 8 and 9, each of the rotation detector means 41 comprises a rotary variable resistor composed of a base plate 46 fixedly mounted in an insulating case 45, and a displacement member rotatably supported on the insulating case 46 by a rotatable shaft 47c and comprising a slider support 47 and a slider 48 made of electrically conductive metal. The slider 48 has a distal end 48a held in slidable contact with an annular resistor layer 46a coated on the base plate 46. When the slider support 47 is rotated about the shaft 47c, the position in which the distal end 48a and the resistor layer 46a are in mutual contact is varied to change the resistance between terminals of the variable resistor. Terminal leads 49 are fixed to the ends of the resistor layer 46a and the slider 48. Two displacement member stops 46b project from the base plate 46 in the vicinity of the ends of the resistor layer 46a in confronting relation to the slider 48. The slider support 47 has a projection 47a disposed for coaction with the stops 46b. The stops 46b and the projection 47a jointly serve as stop means for stopping rotation of the displacement member. The engagement between the stops 46b and the projection 47a defines the range (300°) in which the slider support 47 is rotatable so that the distal end 48a of the slider 48 will not run off the resistor layer 46a. The slider support 47 has a gear 47b formed on an outer periphery thereof and partly projecting out of a side of the insulating case 45. The insulating case 45 has a lower leg (not shown) fitted in the corresponding engagement aperture 34d in the attachment plate 34, thus fastening the rotation detector means 41 to the attachment plate 34.

Figure 10:
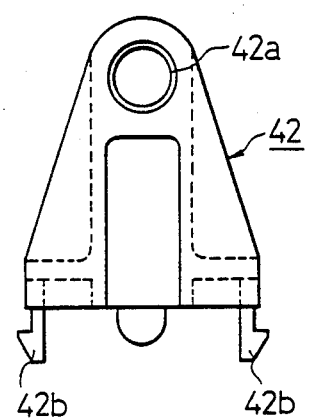
FIG. 10 is a front elevational view of a bearing.
Figure 11:
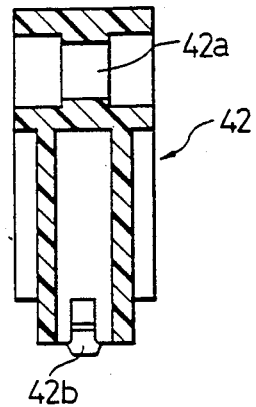
FIG. 11 is a vertical cross-sectional view of the bearing.

FIG. 10 is a front elevational view of the bearing 42 and FIG. 11 is a vertical cross-sectional view of the bearing 42. The bearing 42 is made of polyacetal and has an upper hole 42a through which a rotatable shaft 50 extends and two lower hooks 42b engaging in the engagement apertures 34e in the attachment plate 34. The bearing 42 is securely fastened to the attachment plate 34 under the resiliency of the hooks 42b.

Figure 12:
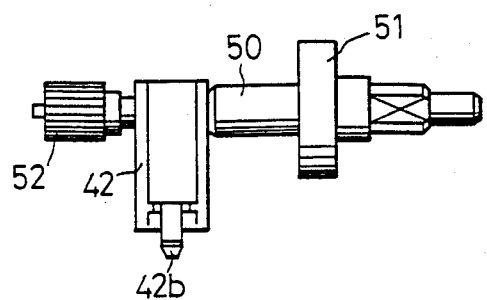
FIG. 12 is a front elevational view a transmission mechanism between a ball and the rotation detector means.
Figure 13:
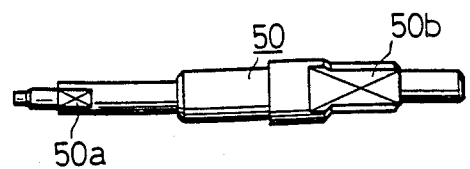
FIG. 13 is a front elevational view of a shaft of the transmission mechanism.
Figure 14A:
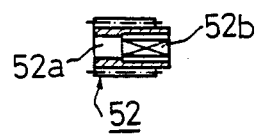
FIG. 14(a) is a cross-sectional view of a speed reduction gear.
Figure 14B:
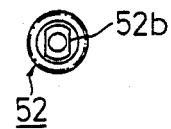
FIG. 14(b) is a side elevational view of the speed reduction gear.
Figure 15A:
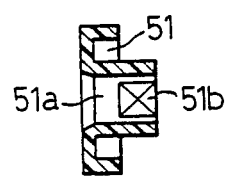
FIG. 15(a) is a cross-sectional view of a driven roller.
Figure 15B:
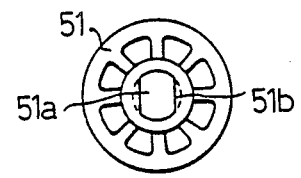
FIG. 15(b) is a side elevational view of the driven roller.
Figure 16A:
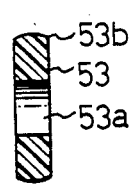
FIG. 16(a) is a cross-sectional view of a driven roller according to another embodiment.
Figure 16B:
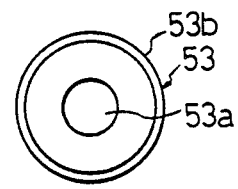
FIG. 16(b) is a side elevational view of the driven roller shown in FIG. 16(a)

FIG. 12 shows the rotatable shaft 51 supporting a driven roller 51 and a speed reduction gear 52 fixed thereto and extending through the bearing 42. FIG. 13 shows the rotatable shaft 50, FIGS. 14(a) and 14(b) show the speed reduction gear 52, FIGS. 15(a) and 15(b) show the driven roller 51, and FIGS. 16(a) and 16(b) show a driven roller according to another embodiment. The rotatable shaft 50 is made of metal and has a flat portion 50a near one end thereof. The speed reduction gear 52 made of polyacetal has a through hole 52a having a flat section 52b fitted over the flat portion 50a of the rotatable shaft 50. Therefore, the speed reduction gear 52 and the rotatable shaft 50 are rotatable in unison with each other. The rotatable shaft 50 also has a larger-diameter flat portion 50b near an opposite end thereof. The driven roller 51 has a through hole 51a having a flat section 51b fitted over the flat portion 50b of the rotatable shaft 50. Therefore, the driven roller 51 and the rotatable shaft 50 are also rotatable in unison with each other. The driven roller 51 is composed of a core body 51A made of rigid polyurethane and a ring 51B made of flexible urethane rubber disposed around the core body 51A. The core 51A is held in secure engagement with the rotatable shaft 50, and the ring 51B and the ball 39 are held in contact under large frictional forces. The entire driven roller 51 is also free from deformation.

Another driven roller 53 shown in FIG. 16 is integrally molded of urethane rubber and has an outer peripheral surface 53b of a slightly rounded configuration. The driven roller 53 of such a design has a smaller area of contact with the ball 39, is given greater frictional forces in the direction of rotation thereof, and is subjected to smaller frictional forces in the axial direction of the roller which is normal to the direction of rotation thereof. This arrangement prevents two such driven rollers 53 rotatable in mutually perpendicular directions from resisting the rotation of each other. While in FIG. 16 the driven roller 53 is integrally formed of urethane rubber, it may be composed of a core body of metal or hard resin such as polyacetal and a ring of rubber disposed around the core body.

Figure 17:
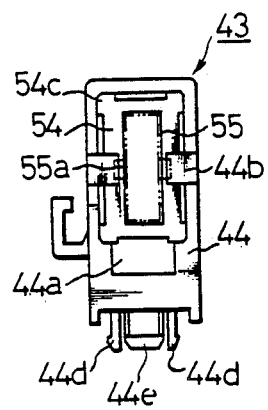
FIG. 17 is a front elevational view of a means for imposing a frictional force.
Figure 18:
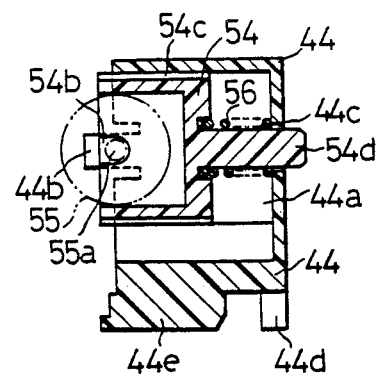
FIG. 18 is a vertical cross-sectional view of the means shown in FIG. 17.

FIG. 17 is a front elevational view of the frictional force imposing means 43 and FIG. 18 is a vertical cross-sectional view of the same. The frictional force imposing means 43 comprises the holder 44, a slider 54 slidable in the holder 44, a frictional force imposing roller 55 rotatably supported on the slider 54, and a spring 56 interposed between the slider 54 and the holder 44 for normally pushing the slider 54 in a direction out of the holder 44.

Figure 19A:
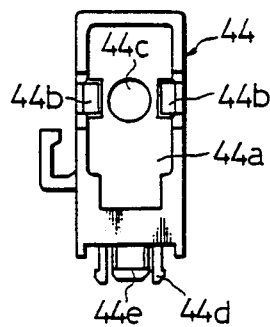
FIG. 19(a) is a front elevational view of a holder.
Figure 19B:
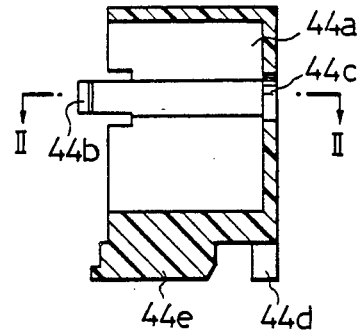
FIG. 19(b) is a vertical cross-sectional view of the holder.
Figure 19C:
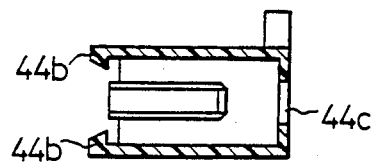
FIG. 19(c) is a cross-sectional view taken along line II—II of FIG. 19(b)

FIGS. 19(a), 19(b) and 19(c) are front elevational, vertical cross-sectional and horizontal cross-sectional views, respectively, of the holder 44. The holder 44 has a housing 44a having an opening in a front side thereof and including a pair of opposite side walls including two respective hooks 44b bent inwardly toward each other in front of the opening, and a rear wall having a hole 44c. The holder 44 also has on its lower end resilient hooks 44d and a projection 44e which engage in the engagement apertures 34f in the attachment plate 34.

Figure 20A:
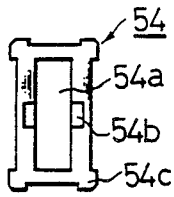
FIG. 20(a) is a front elevational view of a slider.
Figure 20B:
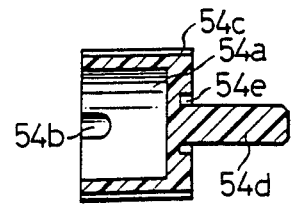
FIG. 20(b) is a vertical cross-sectional view of the slider.
Figure 20C:
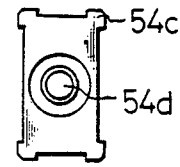
FIG. 20(c) is a rear elevational view of the slider.

FIGS. 20(a), 20(b) and 20(c) are front elevational, vertical cross-sectional and rear elevational views, respectively, of the slider 54. The slider 54 has a central housing 54a for accommodating the frictional imposing roller 55, the housing 54a being defined by a pair of opposite side walls having U-shaped recesses 54b opening toward the front end for supporting the roller 55. The slider 54 also has on outer corners slides 54c projecting from outer wall surfaces and having rounded tops. The slides 54c are held in abutment against wall surfaces of the housing 44a in the holder 44 for smooth sliding movement of the slider 54 in the holder 44. The slider 54 also as a post 54d projecting from a rear wall thereof and fitting in the hole 44c in the holder 44 for stable movement of the slider 54 with respect to the holder 44.

Figure 21A:
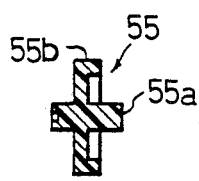
FIG. 21(a) is a cross-sectional view of a roller for imposing a frictional force.
Figure 21B:
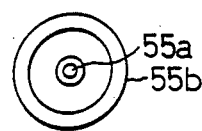
FIG. 21(b) is a side elevational view of the roller.

FIGS. 21(a) and 21(b) are cross-sectional and side elevational views, respectively, of the frictional force imposing roller 55. The roller 55 is integrally molded of polyacetal, and comprises a shaft 55a fitted in the recesses 54b in the slider 54 and a presser 55b held against the ball 39.

Figure 22:
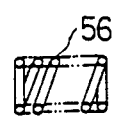
FIG. 22 is a side elevational view of a spring.

FIG. 22 shows the coil spring 56. As shown in FIG. 18, the coil spring 56 is disposed around the post 54d, and has one end fitted in a spring recess 54e defined in a rear wall of the slider 54 and an opposite end engaging a spring bearing portion of an inner wall of the holder 44 for causing the slider 54 to push the frictional force imposing roller 55 normally outwardly.

The frictional force imposing means 43 will be assembled as follows: The shaft 55a is supported in the recesses 54b in the slider 54, and the slider 54 is inserted through the opening in the holder 44 into the latter. Since the hooks 44b of the holder 44 are resiliently spread apart by the slider 54, the slider 54 can be forced into the housing 44a in the holder 44. When the slider 54 moves into the housing 44a to a certain position therein, the hooks 44b engage the front end surface of the slider 54. The recesses 54b are now closed at their front ends by the hooks 44b, and the frictional force imposing roller 55 and the slider 54 are locked together in the holder 44, and normally urged outwardly under the force of the spring 56. The U-shaped recesses 54b have a depth greater than the diameter of the shaft 55a of the roller 55, so that there are slight clearances in front of and behind the shaft 55a in the recesses 54b. With the frictional force imposing roller 55 held in contact with the ball 39, the shaft 55a is pressed against semicircular bottoms of the recesses 54b and will rotate smoothly as the ball 39 rotates.

Figure 3:
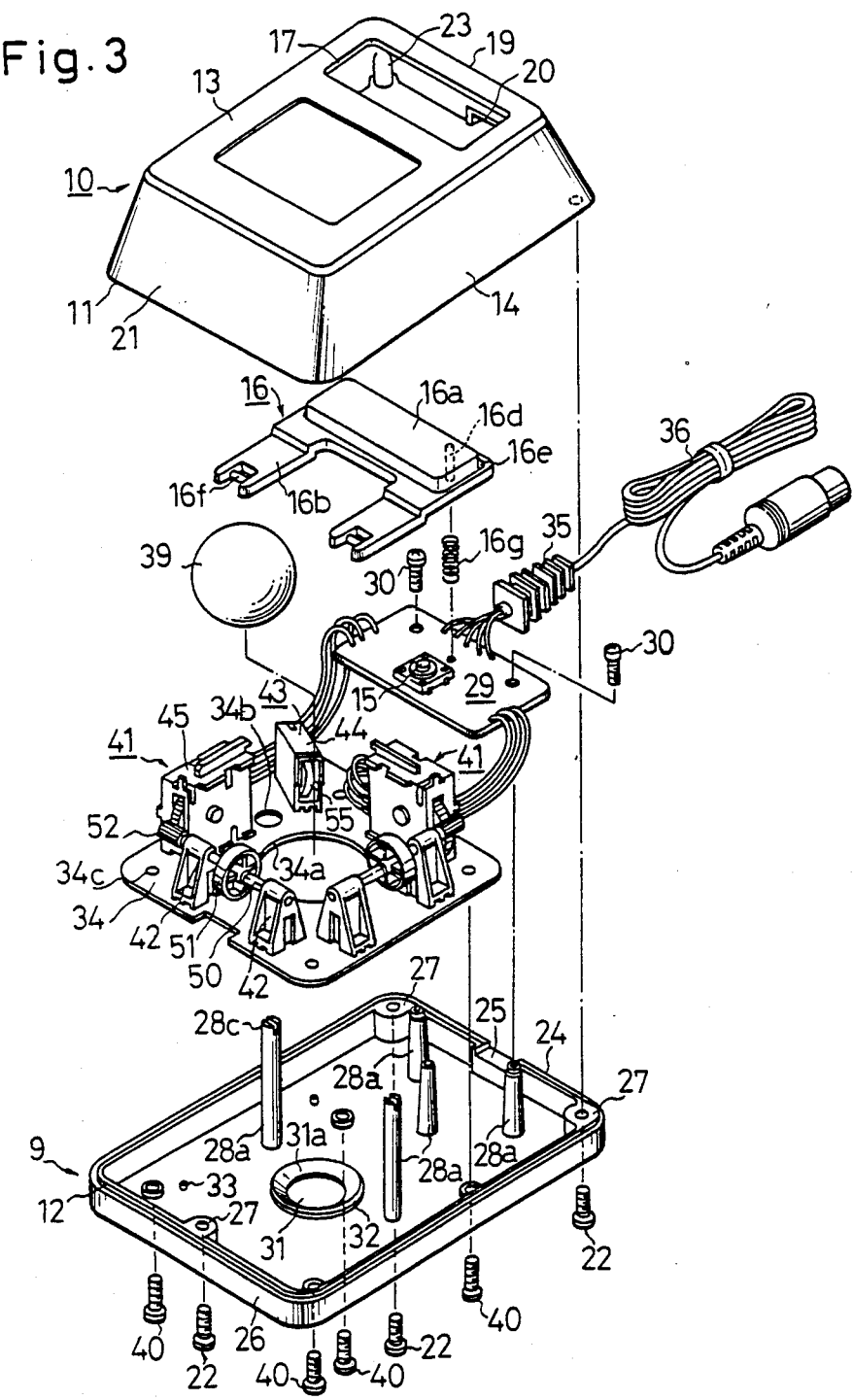
FIG. 3 is an exploded perspective view of the X-Y input device.
Figure 23:
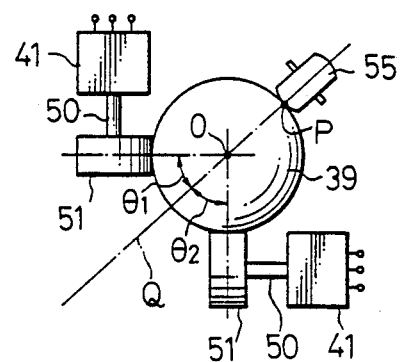
FIG. 23 is a view illustrative of a positional relationship between the ball and the driven rollers.
Figure 24:
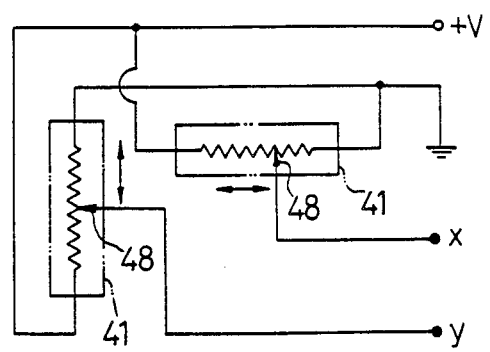
FIG. 24 is a circuit diagram of the rotation detector means, showing the principle of operation thereof.

Operation of the input device thus constructed is as follows:

As shown in FIG. 3, there are two driven rollers 51 and two rotary variable resistors serving as the rotation detector means 41, which are all mounted on the attachment plate 34. The attachment plate 34 is positioned accurately with respect to the opening 31 in the lower case 9 and the ball 39 located in the opening 31 with the opening 34a fitted over the centering annular projection on the lower case 9. Accordingly, the driven rollers 51 and the frictional roller 55 that are mounted on the attachment plate 34 are positioned accurately with respect to the center of the ball 39. The first and second driven rollers 51 are arranged with their axes extending perpendicularly to each other and will individually be rotated in response to rotation of the ball 39. The directions and angles of rotation of the rollers 51 are detected by the rotary variable resistors coupled through speed reduction means each composed of the rotatable shaft 50, the speed reduction gear 52, and the gear 47b of the slider support 47 which is held in mesh with the speed reduction gear 52. More specifically, as illustrated in FIG. 23, the frictional force imposing roller 55 is positioned with respect to the ball 39 such that a straight line Q passing through a point P in which the ball 39 and the roller 55 contact each other and a center 0 of rotation of the ball 39 extends centrally between the two driven rollers 51 ($\theta_1 = \theta_2$). The ball 39 is pressed uniformly against the two driven rollers 51 by the frictional force imposing roller 55. Any rotational condition of the ball 39 is divided into components in X- and Y-axis directions, which are then picked up as directions and angles of rotation of the first and second driven rollers 51, which are detected as voltage values by the variable resistors.

In the display unit 2, the cursor 7 displayed on the screen 6 can be moved in the X- and Y-axis directions by rotating the ball 39. The distance of movement of the cursor 7 is varied dependent on the magnitudes of outputs from the variable resistors or the rotation detector means 41. When the ball 39 is rotated through a greater angle than necessary and signals from the rotary variable resistors become larger than a prescribed level, the cursor 7 disappears at one end of the screen 6 and appears at an opposite end. Such a cursor movement is unnecessary, and fails to achieve appropriate cursor control. According to the input device of the invention, as shown in FIGS. 8 and 9, the two stops 46b mounted on the base plate 46 of each of the rotary variable resistors and the projection 47a mounted on the slider support 47 for engagement with the stops 46b jointly serve as the stop means, and the engagement of the stops 46b and the projection 47a limits the range of rotation of the slider support 47 to about 300° in which the resistor layer 46a extends, thereby preventing the cursor 6 from operating in error. The stop means is not limited to the illustrated mechanical arrangement, but may be of electric nature in an electronic circuit such as an encoder.

To prevent the ball 39 from being locked when the stop means is in operation, the input device of the invention has a force releasing means. The power release means should preferably be provided in a transmission mechanism between the ball 39 and the rotation detector means 41. The form of such force releasing means that can be achieved with utmost ease is a frictional force transmission mechanism. With such a frictional force transmission mechanism, for example, the force A with which the stop 46b blocks the projection 47a and a frictional force B acting between the ball 39 and the driven roller 51 should be selected to have the relationship A>B. The frictional force B can suitably be selected by adjusting the biasing force of the spring 56 for pushing the frictional force imposing roller 55, and the surface roughness of the ball 39 and the driven roller 51. The ball 39 employed according to the present invention is made of stainless steel, has a sphericity of 15 [μm] or smaller, a hardness of HRC 58 or more, and a surface roughness in the range of 12.5 S to 25 S. The ball 39 is degreased with trichloroethylene.

In the foregoing embodiment, the surface of the driven rollers 51 tend to wear due to slippage between the driven rollers 51 and the ball 39, with the result that no correct detection of directions and angles of rotation of the ball 39 can be carried out. To avoid this, the force releasing means may be provided between the driven rollers 51 and the rotatable shaft 50, or between the rotatable shaft 50 and the speed reduction gears 52, or between the speed reduction gears 52 and the slider supports 47. As illustrated in FIGS. 13 and 14, the rotatable shaft 50 and the driven roller 51, and the rotatable shaft 50 and the speed reduction gear 52 are held in interengagement through the flat portions 50a, 50b of the rotatable shaft 50 and the flat portions 51b, 52b of the driven roller 51 and the speed reduction gear 52. The force C with which the rotatable shaft 50 is held in engagement with the driven roller 51 and the speed reduction gear 52 can be lowered by relatively reducing the areas of the flat portions 50a, 50b, 51b, 52b. By selecting the engaging force C so that the force C, the blocking force A of the stop means, and the frictional force B between the driven roller 51 and the ball 39 meet the relationship: C<B<A, the peripheral surface of the driven roller 51 will not slip undesirably, but the force releasing means will slip while the stop means is in operation.

While in the foregoing embodiment the gear 47b of the displacement member is integral with the slider support 47, rne gear 47b may be separate from the rotatable shaft 47c, and frictional forces between the gear 47b and the rotatable shaft 47c may be utilized as engaging forces in the force releasing means. With the stop means, the range of operation of the rotation detector means is limited. Where the rotary variable resistor is used, the angle of operation is about 300°, which is quite small as compared with an appropriate distance that the user moves the input device 4 over the sheet, and the angle of rotation of the ball 39 caused by such movement of the input device. Where the angle of rotation of the ball is small, the range in which the cursor 7 can be controlled is also small, and fine positional control of the cursor 7 is difficult to accomplish. With the input device of the invention, as shown in FIG. 3, the ratio of the number of teeth of the driving speed reduction gear 52 to the number of teeth of the gear 47b around the driven slider support 47 is selected to be 1:3 through 4. Therefore, the driven roller 51 can rotate through the angle ranging from about 900° to 1,200° with respect to the rotation angle 300° of the slider 48 in the variable resistor.

While in the foregoing embodiment the gears are employed as the speed reducer, other means such as rubber rollers and a belt may be used provided a speed reduction ratio remains unchanged.

Although certain preferred embodiments have been shown and described, it should be understood that many changes and modifications may be made therein without departing from the scope of the appended claims.

What is claimed is:

1. In an X-Y input device of the type comprising a casing, a rotatable ball having a portion thereof projecting from the casing, first and second driven rollers in contact rotatably with the rotatable ball, the first driven roller having an axis of rotation perpendicular to the second driven roller, first and second rotation detectors for detecting the amount of rotation of the first and second drive rollers, respectively, and a frictional force imposing roller for holding the rotatable ball in frictional rolling contact with the first and second driven rollers, the improvement comprising said first and second driven rollers being mounted in said casing in fixed position, said frictional force imposing roller being resiliently mounted for resiliently urging said rotatably ball against said driven rollers by mounting means including a shaft mounting said frictional force imposing roller, a slider mounting said shaft and roller and facing in confronting relation to said rotatable ball, a holder fixedly mounted in said casing and having a front opening facing the rotatable ball for accommodating said slider therein with said frictional force imposing roller projecting therefrom, a spring interposed between a rear wall of said holder and said slider for biasing said slider and roller toward said rotatable ball, and a retainer for holding said slider in said front opening of said holder.

2. An improved X-Y input device as claimed in claim 1, wherein said slider has front edges and recesses with open ends formed therein for mounting said shaft, and said retainer of said mounting means includes hooks formed on front ends of the holder which engage said front edges of said slider and close the open ends of said recesses, thus supporting said shaft in said slider and holding said slider in said holder.

3. An improved X-Y input device as claimed in claim 2, wherein said recesses are U-shaped and have a depth larger than a diameter of said shaft for supporting said shaft with a clearance.

4. In an X-Y input device of the type comprising a casing, a rotatable ball having a portion thereof projecting from the casing, first and second driven rollers in contact rotatable with the rotatable ball, the first driven roller having an axis of rotation perpendicular to the second driven roller, first and second rotation detectors including first and second displacement members for detecting the amount of rotation of the first and second driven rollers, respectively, and a frictional force imposing roller for holding the rotatable ball in frictional rolling contact with the first and second driven rollers, the improvement comprising stop means for limiting the displacement of each of said first and second displacement members to a predetermined displacement range, thereby preventing any further displacement of said displacement members outside and predetermined range and maintaining output values of said first and second rotation detectors constant at the limits of said predetermined range, said stop means providing a blocking force to said displacement members and said driven rollers greater than a frictional force between said rotatable ball and said driven rollers, such that when said displacement members reach the limits of said predetermined range, said stop means blocks rotation of said drive rollers and said rotatable ball slips in rotation on said blocked driven rollers.

5. An improved X-Y input device as claimed in claim 4, wherein said rotation detectors are rotary variable resistors.

6. An improved X-Y input device as claimed in claim 5, wherein said rotary variable resistors each comprise a fixed resistor layer, said respective displacement member of said rotation detector being slidable on said fixed resistor layer, and said stop means being disposed on one portion of said fixed resistor layer to intercept said displacement member at a predetermined position.

7. An improved X-Y input device as claimed in claim 4, further comprising a speed reducer disposed between each of said driven rollers and a corresponding one of saidd rotation detectors.

8. In an X-Y input device of the type comprising a casing, a rotatable ball having a portion thereof projecting from the casing, first and second driven rollers in contact rotatably with the rotatable ball, the first driven roller having an axis of rotation perpendicular to the second driven roller, first and second rotation detectors including first and second displacement members for detecting the amount of rotation of the first and second driven rollers, respectively, and a frictional force imposing roller for holding the rotatable ball in frictional rolling contact with the first and second driven rollers, the improvement comprising stop means for limiting the displacement of each of said first and second displacement members of said rotation detectors to a predetermined displacement range, said stop means providing a blocking force to said displacement members greater than a frictional force between said rotatable ball and said driven rollers, thereby preventing any further displacement of said displacement meembers outside said predetermined range and maintaining output values of said first and second rotation detectors constant at the limits of said predeterrmined range, and force releasing means disposed in a force transmission path between each of said driven rollers and a corresponding one of said rotation detectors for releasing a portion of the frictional force from said driven roller and applying an engagement force smaller than said blocking force to said rotation detector, such that when said displacement members reach the limits of said predetermined range, they are stopped from moving by said stop means and said force releasing means operates to reduce the force transmitted from said rotatable ball through said driven rollers applied to said rotation detectors.

9. An X-Y input device as claimed in claim 8, wherein said frictional force is smaller than said blocking force and said engagement force is smaller than said frictional force, such that when said displacement members of said rotation detectors reach the limits of said predetermined range, said displacement members are prevented from moving, said force releasing means is actuated, and said rotatable ball is allowed to rotate with said driven rollers.

10. An X-Y input device as claimed in claim 8, wherein said driven rollers are each mounted on a shaft, and said force releasing means comprises means for releasing frictional forces applied between said shaft and a corresponding one of said driven rollers.

11. An X-Y input deyice as claimed in claim 8, further comprising a speed reducer disposed in said transmission path.

12. An X-Y input device as claimed in claim 11, wherein said force releasing means is provided in said speed reducer.

13. An X-Y input device as claimed in claim 12, wherein each of said displacement members is mounted on a rotatable shaft, said speed reducer comprising a smaller gear attached to each of said shafts of said drive rollers and a larger gear attached to each said rotatable shaft of said displacement member and held in mesh with said smaller gear, and said force releasing means comprising means disposed between said smaller gear and said shaft of said driven roller for releasing frictional forces in excess of said engagement force.

14. An X-Y input device as claimed in claim 8, wherein said displacement members are each mounted on a shaft, and said force releasing means comprises means for releasing frictional forces applied between said shaft and a corresponding one of said displacement members.

* * * * *